(12) United States Patent
Flood

(10) Patent No.: US 6,542,289 B2
(45) Date of Patent: Apr. 1, 2003

(54) GAIN SATURATION TUNING IN OPTICAL AMPLIFIERS

(75) Inventor: Felton A. Flood, Somerset, NJ (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/120,321

(22) Filed: Apr. 10, 2002

(65) Prior Publication Data

US 2002/0141043 A1 Oct. 3, 2002

Related U.S. Application Data

(63) Continuation of application No. 09/443,078, filed on Nov. 18, 1999, now abandoned.

(51) Int. Cl.[7] .................................................. H01S 3/00
(52) U.S. Cl. ..................................................... 359/337.1
(58) Field of Search ............................ 359/337.1, 341.1

(56) References Cited

U.S. PATENT DOCUMENTS

| 5,345,332 A | * | 9/1994 | daSilva et al. | ............ 359/337.1 |
|---|---|---|---|---|
| 5,920,423 A | | 7/1999 | Grubb et al. | ................ 359/341 |
| 6,049,414 A | | 4/2000 | Espindola et al. | ........... 359/337 |
| 6,144,486 A | * | 11/2000 | Bennett et al. | ......... 359/337.13 |

OTHER PUBLICATIONS

Walker, G.R., 'Gain and Noise Characterisation of Erbium Doped Fibre Amplifiers', Electronics Letters, Apr. 25, 1997, vol. 27, No. 9, pp. 744–745.*

* cited by examiner

*Primary Examiner*—Thomas G. Black
*Assistant Examiner*—Deandra M. Hughes
(74) *Attorney, Agent, or Firm*—Mary Y. Redman

(57) ABSTRACT

A method for controlling the shape and magnitude of the L-band gain spectrum of an erbium doped optical amplifier, in one aspect, involves saturating the amplifier gain with a saturating signal in the L-band. Another aspect of the method involves saturating the amplifier gain by controlling the temperature of the gain medium. By pumping the amplifier in the 980 nm and/or the 1480 nm pump bands, the gain spectra at different inversion levels are adjusted.

6 Claims, 5 Drawing Sheets

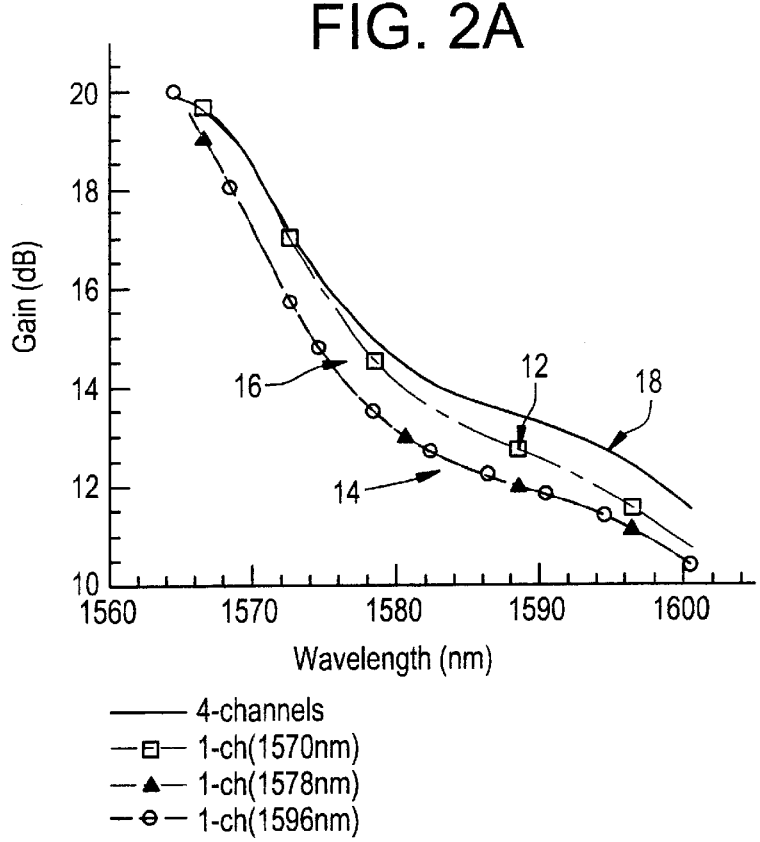
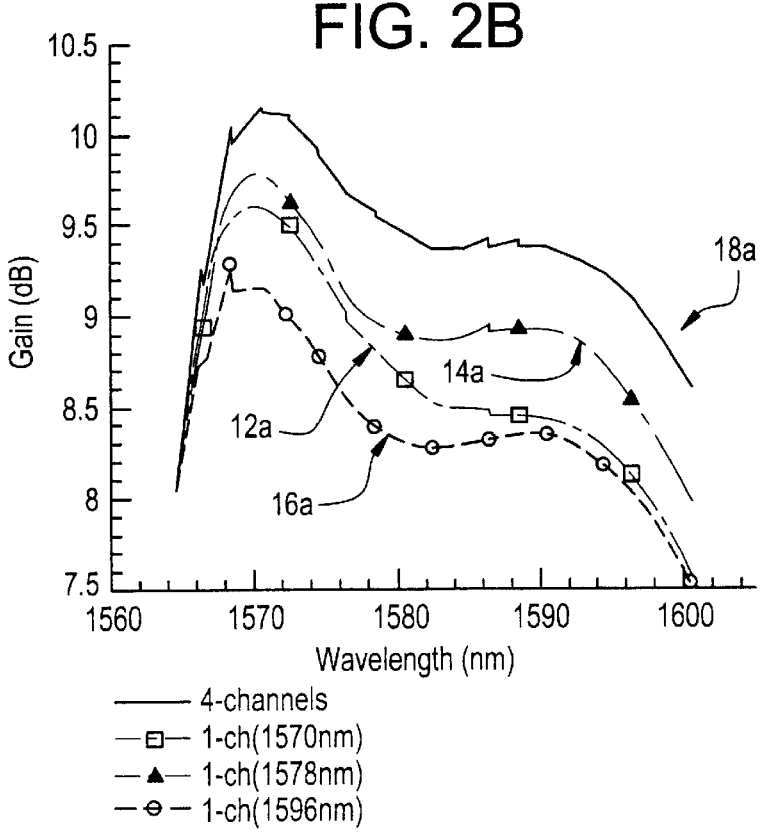

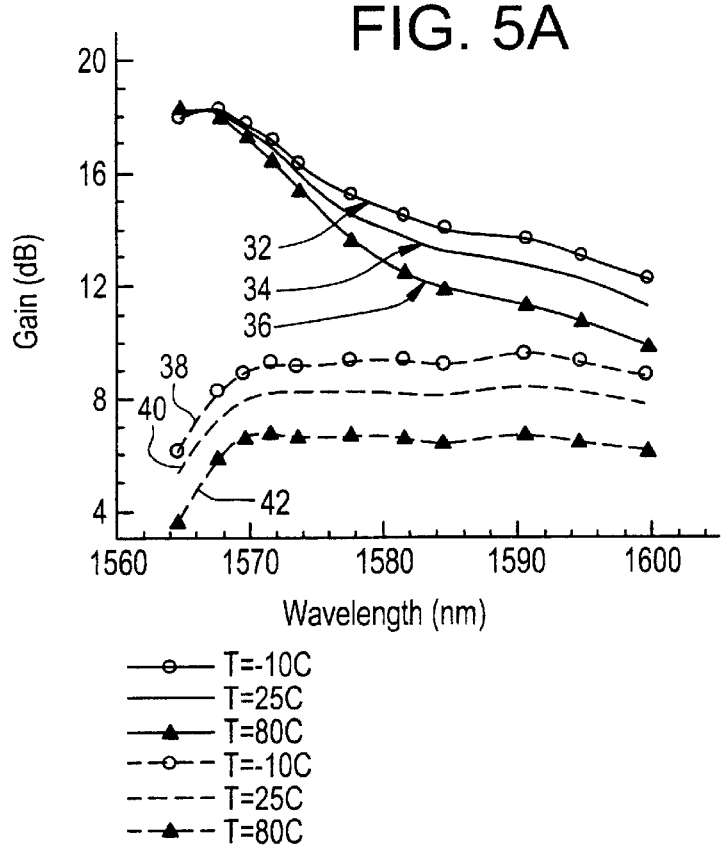
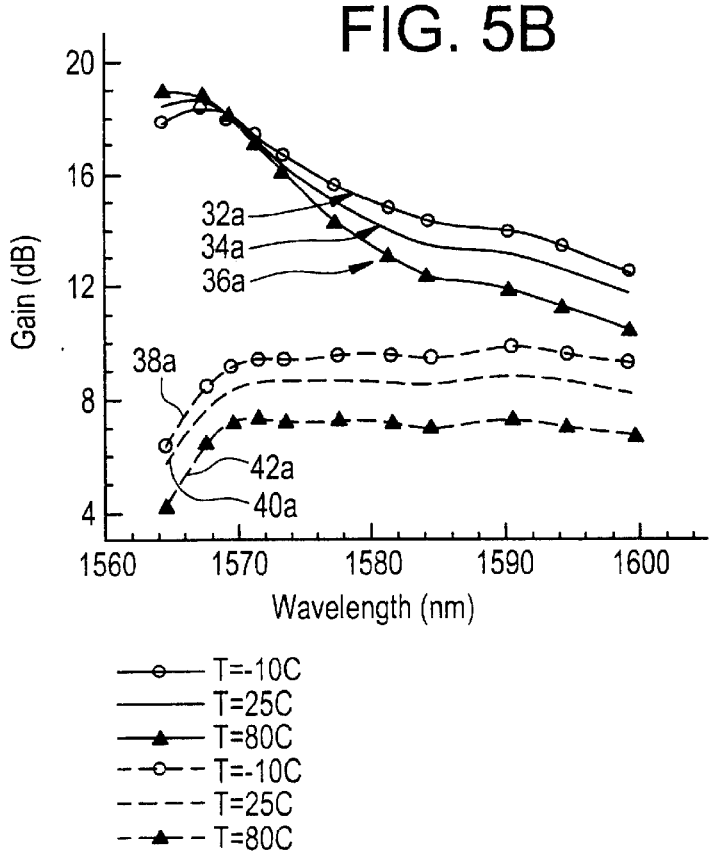

GAIN SATURATION TUNING IN OPTICAL AMPLIFIERS

This is a continuing application claiming the priority of U.S. application Ser. No. 09/443,078 filed on Nov. 18, 1999 now abandoned—entitled "Gain Saturation Tuning in Optical Amplifiers", which is hereby incorporated by reference in its entirety.

FIELD OF THE INVENTION

This invention relates to optical amplifiers. More particularly, the invention relates to controlling gain characteristics of an optical amplifier in the extended or longer wavelength region of the gain spectrum by controlling the amplifier's operating conditions.

BACKGROUND OF THE INVENTION

The ability to affect spectral gain shape in a predictable and significant manner would be of great use in the design and control of optical amplifiers and, particularly, erbium-doped fiber amplifiers. Expanding the spectral bandwidth in which optical telecommunications signals can be transmitted is also highly desirable. In an erbium-doped amplifier the conventional gain bandwidth, which is commonly referred to as the C-band, extends from approximately 1520 nm to approximately 1560 nm thus providing approximately 40 nm of bandwidth for optical transmission signals but the erbium C-band has inherent limitations. They include a limited bandwidth and non-uniform gain over the C-band which characterizes typical amplifier systems. A discussion of these issues can be found in U.S. Pat. No. 6,320,693 by Cereo et al. entitled "Thermal Tuning of Optical Amplifiers and Use of Same in Wavelength Division Multiplex Systems," filed on Jun. 29, 1999 (hereinafter referred to as the "Cereo application"), which is incorporated by reference herein as if set forth in its entirely. One approach to increase the useable transmission signal bandwidth of erbium-doped amplifiers is to take advantage of the spectral region from approximately 1565 nm to approximately 1620 nm which is commonly referred to as the erbium extended band or L-band (hereinafter referred to as the L-band).

A long-standing belief with respect to erbium-doped optical amplifiers was that the gain of the amplifier is essentially homogeneous in character and could be described by the homogeneous model discussed in, for example, C. R. Giles et al. "Modeling Erbium-Doped Fiber Amplifiers," *Journal of Lightwave Technology*, vol. 9, pp. 271–283 (1991), and C. R. Giles et al. "Optical Amplifiers Transform Long Distance Lightwave Telecommunication," *Proc. IEEE*, vol. 84, pp. 870–883 (1996). The essence of this assumption is that the gain of an amplifier is determined by the average inversion of the active species (for example, the erbium ions in an erbium-doped fiber amplifier) irrespective of the particular signal wavelengths, signal powers, pump wavelength, and pump power which produced that average inversion. In other words, the assumption of homogeneous broadening means that if the gain at any one wavelength is by some means stabilized to a particular value, then a gain at the other wavelengths is similarly stabilized (the stabilized value of the gain being different at different wavelengths). By means of this assumption, a gain spectrum for an amplifier is calculated for a given average inversion.

While the homogeneous gain model may sufficiently describes the wavelength region from about 1540 nm to about 1565 nm, commonly referred to as the "red band," it has been found that this model does not work well in the "blue band" which extends from approximately 1525 nm to about 1545 nm. This is discussed in more detail in U.S. Pat. No. 6,144,486, entitled "Pump Wavelength Tuning of Optical Amplifiers and Use of Same in Wavelength Division Multiplex Systems," by Bennett et al., which was filed on Jan. 30, 1998 (hereinafter referred to as the "Bennett application"), which is hereby incorporated by reference as if set forth in its entirety herein. The blue band exhibits substantial inhomogeneous behavior. For example, when at least one signal wavelength is in this band the gain spectrum can no longer be described by a single average inversion that applies to all active species. Inhomogeneous gain saturation is manifested in the C-band by the well-known phenomenon of spectral hole burning wherein a narrow bandwidth dip occurs in the gain spectrum at the saturating wavelength. Moreover, a temperature-induced gain saturation phenomenon known as "thermal wiggle" has also been observed in the erbium C-band. This is described in the above-referenced Cereo application. Manifestations of spectral hole-burning and thermal wiggle in the L-band operating environment are quite distinct from the manifestations in the C-band. Accordingly, there is a need for a method of controlling the L-band gain spectrum due to the inhomogeneous broadening observed therein.

Gain tilt in WDM transmission systems is also a concern. In general terms, the gain spectrum $G(\lambda)$ of an optical amplifier is a function of a variety of variables, including input powers at the signal wavelengths $\lambda_1$ through $\lambda_n$, (signal wavelengths may themselves vary from application to application and thereby affect the gain spectrum); pump power and pump wavelength, the average inversion of the fiber (itself a function of the input powers and the pump power, as well as the length of the fiber), the temperature of the amplifying medium, and various other variables. Gain tilt is the term used in the art to describe the fact that under different operating conditions, an optical amplifier will amplify different channels to different relative extents. Although various changes in operating conditions can be considered, a particularly important change is that which occurs when the level of signal power at one, or more of the signal wavelengths changes. For example, the signal power at all of the signal wavelengths will change as the distance between amplifiers along a transmission line changes, e.g., the power will go down as the distance increases.

For the simplest case of a two-channel system, the gain tilt (GT) between operating condition O1 and operating condition O2 can be written:

$$GT_{O1 \to O2}(\lambda_1, \lambda_2) = \Delta G_{O1 \to O2}(\lambda_1) / \Delta G_{O1 \to O2}(\lambda_2)$$

where $\Delta G_{O1 \to O2}(\lambda_1)$ and $\Delta G_{O1 \to O2}(\lambda_2)$ are, respectively, the changes in gain at $\lambda_1$ and $\lambda_2$ in going from operating condition O1 to operating condition O2 and the units of gain tilt are dB/dB.

A gain tilt of 1.0 means that the change in gains at $\lambda_1$ and $\lambda_2$ are the same so that if the gain spectrum of the amplifier was substantially flat (i.e., substantially free of ripple) for signals at $\lambda_1$ and $\lambda_2$ for operating condition O1, it will also be substantially flat for operating condition O2.

In practice, however, the gain tilt is not equal to 1.0. Instead, a change in operating conditions results in an increase in gain for some wavelengths (e.g., shorter wavelengths) relative to other wavelengths (e.g., longer wavelengths). That is, a plot of $G(\lambda)$ versus $\lambda$ appears to have undergone a rotation (a "tilting") in either a clockwise direction (if the gain at shorter wavelengths is increased relative to the gain at longer wavelengths) or counterclockwise direction (if the gain at longer wavelengths is increased relative to the gain at shorter wavelengths) as a result of the change in operating condition. Hence the name "gain tilt." In addition to a rotation, the plot of G(λ) versus λ can undergo a net upward or downward shift along the vertical gain axis as a result of the change in operating conditions. Also, localized changes at particular wavelengths can occur affecting ripple.

Rotation of the gain spectrum with a change in operating conditions is a problem in WDM systems since any passive system that is designed to equalize the power output of the channels for one specific set of operating conditions is likely to fail to provide equalization when those conditions are changed.

Accordingly, there is a need to control this gain tilt phenomenon in the L-band.

SUMMARY OF THE INVENTION

An embodiment of the invention provides a method of operating an erbium doped optical amplifier for amplifying a signal in a spectral region above about 1565 nm. This method includes the step of controlling the shape of the gain spectrum of the optical amplifier by nonhomogeneously saturating the gain of the amplifier. It may include the step of positioning a gain saturating signal at a selected wavelength in the spectral region, or the step of positioning a single gain saturating signal at a single selected wavelength in the spectral region. In another aspect, the invention may further include the step of changing the nonhomogeneous gain saturation (NGS) at a particular saturating wavelength by pumping the amplifier in a pump band of approximately 980 nm or approximately 1480 nm.

In another aspect of the invention, the pumping in the 980 nm band may result in decreased NGS for saturating signals in a shorter wavelength region and increased NSG for saturating signals in a longer wavelength region relative to pumping in the 1480 nm band.

Another aspect of the invention is directed to a method of operating a long-band erbium doped optical amplifier which includes a gain medium for amplifying a signal in an L-band spectral region from about 1565 nm to about 1620 nm of an associated L-band gain spectrum of the amplifier. This method may include the step of controlling the shape of the gain spectrum of the optical amplifier by controlling the temperature of at least a portion of the gain medium in a manner which saturates the gain of the amplifier. Controlling the temperature may include the step of varying the temperature of the gain medium in a range from about −10 to about 80 degrees Celsius.

The invention may apply to any optical amplifier having a rare earth-doped, non-homogeneously broadened gain medium in which amplification is produced by stimulated emission, such as an erbium doped fiber amplifier.

The optical amplifier to which the method according to the invention applies may preferably an optical fiber amplifier. The amplifier may alternatively be a planar amplifier or other type amplifier most suitable to available manufacturing and assembly techniques. The method according to the invention may also apply to single and/or multi-stage optical amplifiers, hybrid amplifiers, and gain media compositions that may take the form of glass and/or glass ceramics and compositions including silicates, borates, and the like, and ZBLAN and variations thereof.

BRIEF DESCRIPTION OF THE DRAWINGS

FIG. 2a is a graph showing plots of gain vs. wavelength for three single wavelength channels and a fourth composite channel with 1480 nm band pumping at high inversion;

FIG. 2b is a graph showing plots of gain vs. wavelength for three single wavelength channels and a fourth composite channel with 1480 nm band pumping at low inversion;

FIG. 5a is a graph showing plots of gain vs. wavelength due to temperature induced gain saturation at various temperatures for high inversion and low inversion when pumped at 1480 nm; and FIG. 5b is a graph showing plots of gain vs. wavelength due to temperature induced gain saturation at various temperatures for high inversion and low inversion when pumped at 980 nm.

Figure 1:
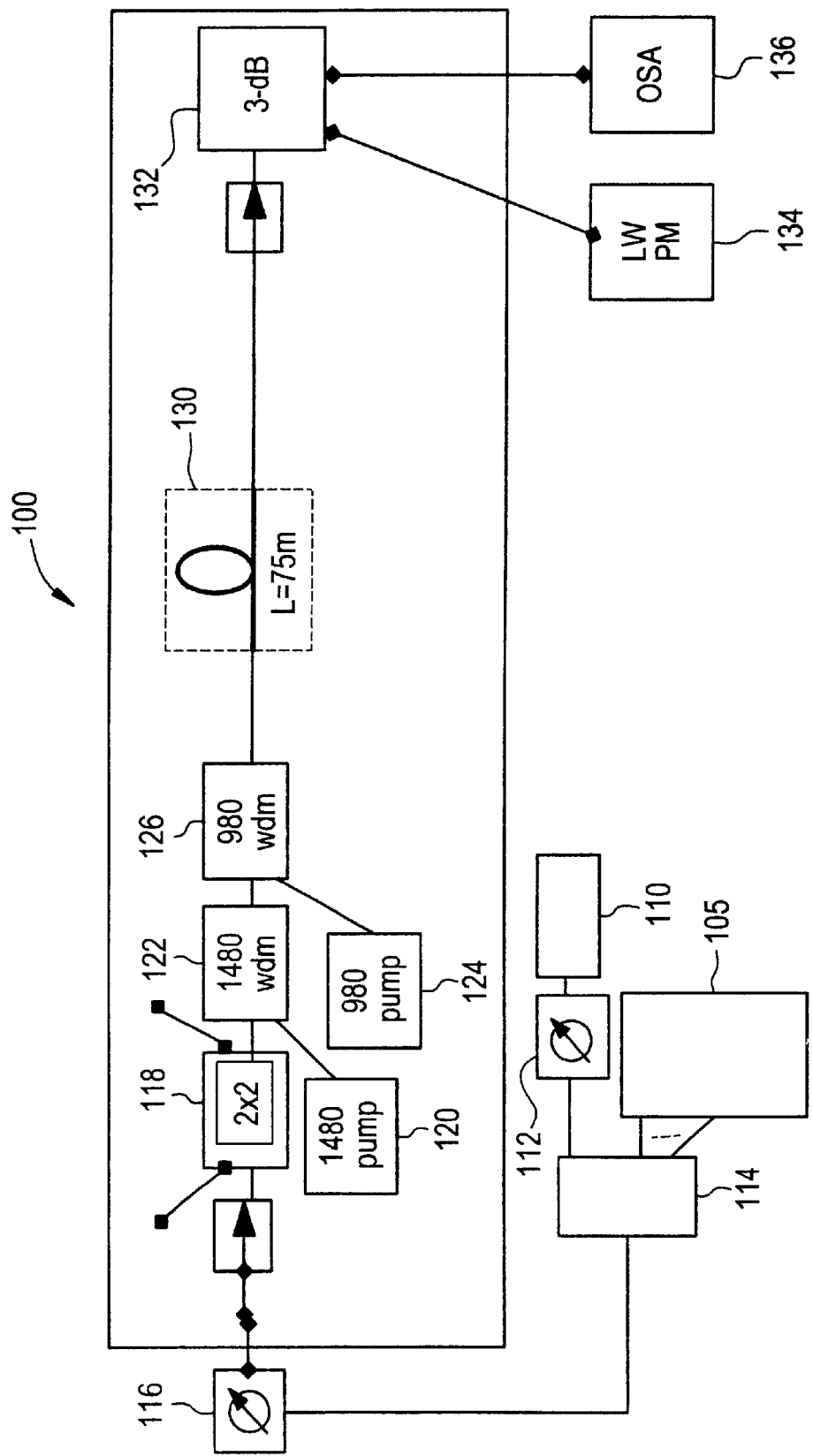
FIG. 1 is a schematic of an optical setup used to collect experimental data for an embodiment of the invention.

The foregoing drawings, which are incorporated in and constitute part of the specification, illustrate the preferred embodiments of the invention, and together with the description, serve to explain the principles of the invention. It is to be understood that both the drawings and the description are explanatory only and are not restrictive of the invention.

DETAILED DESCRIPTION OF A PREFERRED EMBODIMENT

The present invention relates to the control of the gain spectrum of an optical amplifier operating in the L-band where the method of control is related to the non-homogeneous gain saturation of the gain medium. By the methods described herein, the shape of the gain spectrum can be adjusted to achieve desired amplification levels at a desired set of signal wavelengths and powers.

In the foregoing discussion and that which follows, the following terms are used in the following ways: the phrase "shape of an amplifier's gain spectrum" is used in its broadest sense and is intended to cover any and all aspects of a gain vs. wavelength plot including, without limitation, the overall orientation (tilt) of the plot, the average gain for the plot, and the values of the gain at specific wavelengths; the term "average inversion of an amplifying medium or a portion thereof" means the fraction of the active species, for example, erbium atoms, which are in a state from which emission in the signal band can be stimulated; and the term "saturation" describes in its broadest sense the operating regime of the amplifier, particularly when the amplifier's gain is less than the maximum achievable gain. Moreover, although saturation is conventionally related to changes in either the input signal power or pump power/pump wavelength, the phrase "temperature-induced gain saturation" (TIGS) will refer herein to inhomogeneously saturating the gain through control of the temperature of the gain medium. Finally, inverson is designated as $N_2$, the term "higher average inversion" is defined as $N_2>0.41$ and low average inversion is defined as $N_2 \leq 0.41$.

The invention can be used with a variety of optical amplifier designs. The amplifier will include at least one amplifying medium and at least one pump, and may optionally include other components such as gain flattening filters, ASE suppression components, and others. Preferred amplifying media are rare earth-doped materials, such as, for example, erbium-doped glasses. The amplifying medium is preferably configured as a waveguide, such as an optical waveguide fiber. The pump is preferably a semiconductor laser or a fiber laser operating in the 980 nm band or 1480 nm band. Simultaneous pumping at 980 and 1480 nm or other suitable wavelength bands can also be implemented depending upon design and performance considerations.

Those skilled in the art will recognize that the invention is not limited to erbium-doped planar or fiber type amplifiers. It may also apply to other rare earth-doped optical amplifiers that are characterized by inhomogeneous gain broadening as is the case for erbium doped gain media.

I. Non-Homogeneous Gain Saturation (NGS)

FIG. 1 shows an experimental setup 100 used to collect data for the examination of nonhomogeneous gain saturation. A bank of four lasers 105 for providing gain saturating signals at three separate wavelengths and a fourth laser used to provide a composite saturating signal are coupled into the a variable optical attenuator (VOA) 116 by multiplexer 114. A small signal probe laser 110 is also coupled to a different VOA 112 and through multiplexer 114 into VOA 116. The signals output from the VOA 116 propagated through a 2×2 coupler 118 that provided a 5% tap in both directions for monitoring purposes. 1480 nm band pump light 120 is introduced into the line by WDM 122 and 980 nm band pump light 124 is similarly introduced by WDM 126. A 75 meter length of erbium doped fiber 130 is in the transmission line and provides the L-band gain. A 3 dB coupler 132 splits the output from fiber 130 and directs a portion of the light to a power meter 134 and a portion to an optical spectrum analyzer 136.

Gain spectra were measured between 1565 nm and 1600 nm using a small-signal probe. Three different single saturating signals at 1570, 1578, and 1596 nm and a composite saturating signal including signal light at wavelengths of 1570, 1578, 1586 and 1596 nm were used to observe the effect on the amplifier gain spectrum. The three saturating wavelengths were chosen to represent the shorter, middle and longer wavelength regions, respectively, of the L-band. In all cases the gain was held fixed at 1565 nm in an attempt to fix the average inversion. If the gain medium exhibited completely homogeneous behavior, then fixing the gain at any wavelength would ensure a nonvarying gain spectrum, notwithstanding systemic measurement errors, regardless of saturation signal placement. The spectral gain variations (when gain at 1565 nm is held fixed) observed in FIGS. 2a and 2b establish the nonhomgeneous character of the gain medium.

FIG. 2a shows curves that are plots of gain versus wavelength for each of the three single and one composite signal(s) referred to above. Curve 12 is the plot for $\lambda_{signal}$=1570 nm. Curve 14 is the plot for $\lambda_{signal}$=1578 nm. Curve 16 is the plot for $\lambda_{signal}$=1596 nm. Curve 18 is the plot for composite $\lambda_{signal}$=1570 nm, 1578 nm, 1586 nm and 1596 nm. The amplifier fiber 130 (shown in FIG. 1) was pumped in the 1480 nm pump band, referred to here for simplicity as $\lambda_p$=1480 nm. The gain spectra shown in FIG. 2a are representative of a high inversion value of the amplifier. Hereinafter, for the L-band amplifier operation according to the invention, inversion is designated as $N_2$ is defined as $N_2$>0.41 and low inversion is defined as $N_2 \leq 0.41$. The curves 12, 14, 16, 18 demonstrate how gain spectra of the L-band amplifier can be altered by positioning a single saturating signal at the different wavelengths. Curve 18, the plot for the composite signal, represents the most homogenous gain spectrum and provides a reference spectrum.

FIG. 2b shows plots of gain versus wavelength for each of the three single and one composite signal(s) as in FIG. 2a except that the gain spectra shown in FIG. 2b are representative of a low inversion value of the amplifier. Curves 12a, 14a, 16a and 18a are plots for signals at $\lambda_{signal}$ equal to 1570 nm, 1578 nm, 1596 nm, 1596 nm and the composite signal, respectively.

Figure 3A:
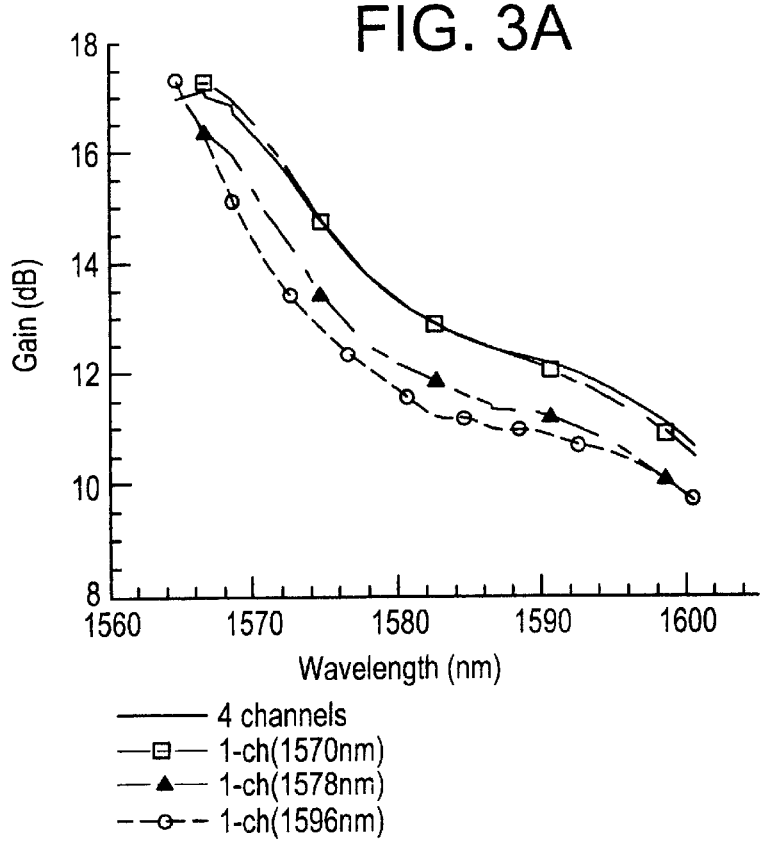
FIG. 3a is a graph showing plots of gain vs. wavelength for three single wavelength channels and a fourth composite channel with pumping in the 980 nm pump band at high inversion.
Figure 3B:
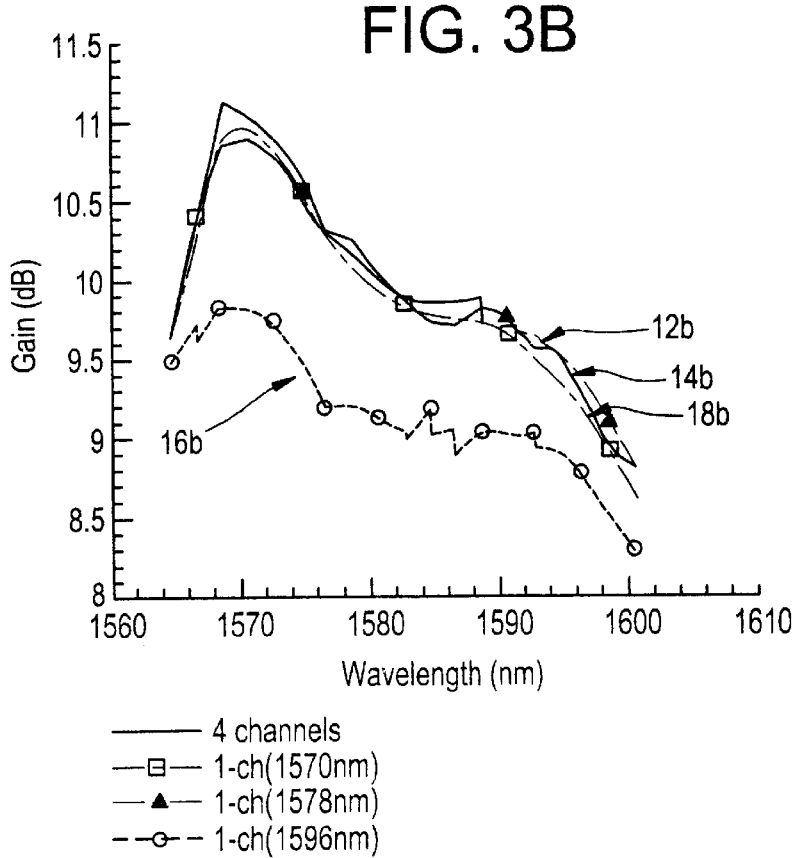
FIG. 3b is a graph showing plots of gain vs. wavelength for three different single wavelength channels and a fourth composite channel with pumping in the 980 nm band at low inversion.

FIGS. 3a and 3b show NGS behavior for pumping in the 980 nm band ($\lambda_p$=980 nm). Curves 12b, 14b, 16b and 18b in FIG. 3a are plots for signals at $\lambda_{signal}$ equal to 1570 nm, 1578 nm, 1596 nm, 1596 nm and the composite signal at high inversion, respectively, and curves 12c, 14c, 16c and 18c in FIG. 3b are plots for 1570 nm, 1578 nm, 1596 nm, 1596 nm and the composite signal at low inversion. The figures demonstrate that gain can be varied by as much as 2 dB across the entire L-band spectrum. Pumping in the 980 nm band resulted in decreased NGS at 1570 nm and 1578 nm and increased NGS at 1596 nm compared to the 1480 nm pump band. The C-band manifestation of this phenomenon, spectral hole burning, is well understood. C-band spectral hole burning is characterized by well-defined spectral gain depressions, typically about 2 nm to 4 nm wide, which tend to become deeper and narrower at shorter wavelengths. The "broadband" gain depression exhibited in the L-band is, however, distinctively wider and provides a useful tool for spectral gain control.

It is believed that this unique L-band NGS behavior is directly related to the reverse traveling amplified spontaneous emission (ASE) power. The L-band erbium gain coefficients are an order of magnitude smaller than the C-band gain coefficients. Because of this, L-band amplifiers require comparatively longer erbium coil lengths, typically $\geq 50$ m. The difference in gain coefficient values gives rise to substantial backward ASE power. This backward ASE power plays a dominant role, relative to the saturating signals, in determining the amplifier operating point, in contrast to C-band spectral hole burning where it is the saturating signals alone that determine the amplifier operating point.

The broadband NGS that results from positioning saturating (or "dummy") signals within the L-band may be used to alter the amplifier gain spectrum in a predictable way. Furthermore, by employing 980 nm or 1480 nm pump bands, one can enhance or diminish the impact of NGS at different points within the L-band.

II. Temperature-induced Gain Saturation (TIGS)

Figure 4:
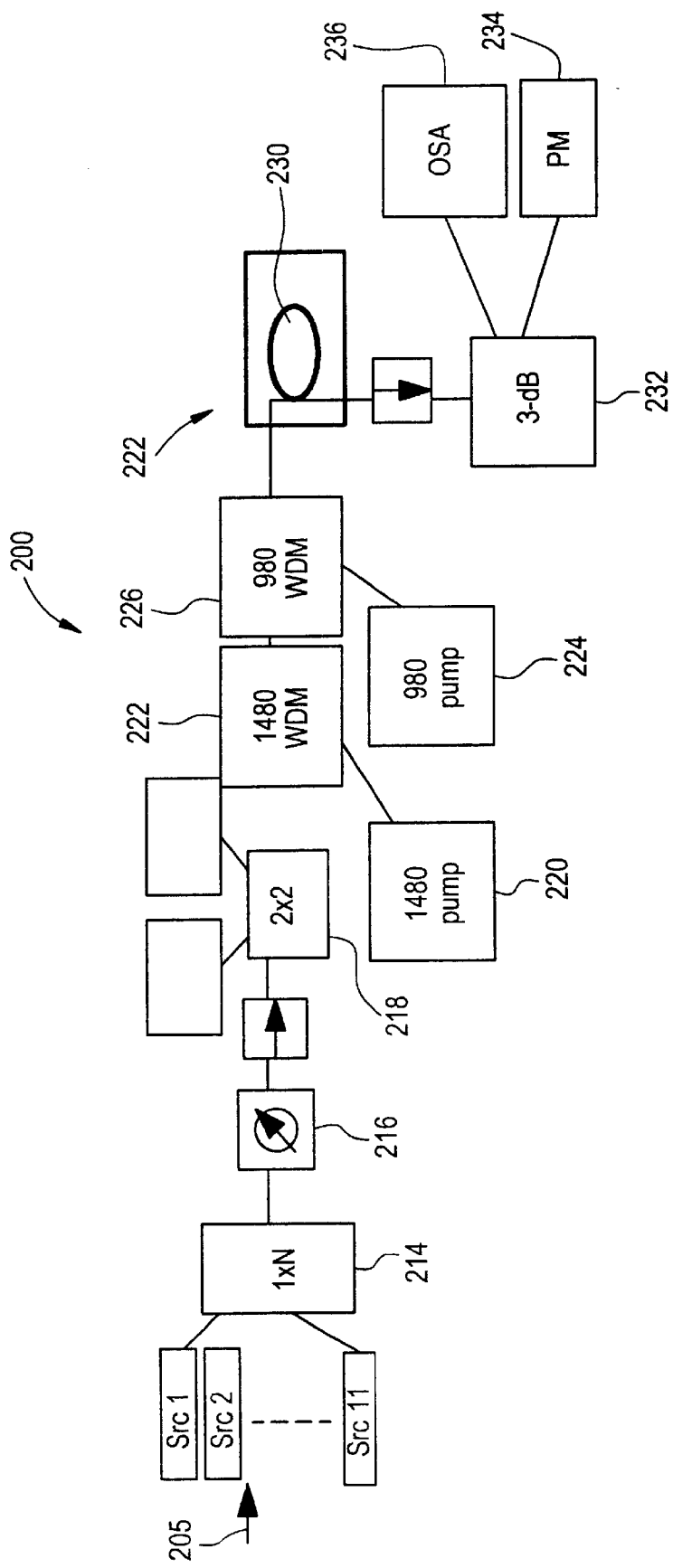
FIG. 4 is a schematic of an optical setup used to collect experimental data for another embodiment of the invention.

The set-up 200 used to collect experimental data to investigate temperature-induced gain saturation is illustrated in FIG. 4. A bank of eleven signal lasers 205 are coupled by multiplexer 214 through a VOA 216 into a 2×2 coupler 218. Coupler 218 has output taps for monitoring purposes. The signal output from coupler 218 is combined with 1480 nm band pump light 220 via WDM 222 and with 980 nm band pump light 224 via WDM 226. A 75 m length of erbium doped fiber 230 is housed in a thermal chamber 228 for changing and controlling the temperature of the gain medium. The output is input into a 3 dB coupler 232 where part of the light is sent to a power meter 234 and part is sent to an optical spectrum analyzer 236. All components of the set-up 200 are commercially available.

FIGS. 5a and 5b show plots of gain versus wavelength at several temperatures. These plots demonstrate the impact of erbium coil temperature control on the amplifier gain spectrum. In this example, gain was measured using eleven CW L-band tunable lasers. Referring to FIG. 5a, the curves labeled 32, 34 and 36 represent gain spectra for erbium coil temperatures of −10, 25, and 80 degrees Celsius, respectively, for high inversion, while the plots labeled 38, 40 and 42 represent gain spectra for erbium coil temperatures of −10, 25 and 80 degrees Celsius, respectively, for low inversion. All plots in FIGS. 5a and 5b are for the 1480 nm pump band. FIG. 5b shows data for pumping in the 980 nm pump band. Curves 32a, 34a, and 36a represent gain spectra at coil temperatures of −10, 25 and 80 degrees Celsius, respectively, for high inversion. Curves 38a, 40a, and 42a represent gain spectra for coil temperatures of −10, 25 and 80 degrees Celsius, respectively, for low inversion.

The observed dependence of signal gain on temperature distinguishes L-band behavior from that observed for C-band. In the C-band, average gain is known to be independent of temperature, assuming the amplifier is saturated. This means that in the C-band, total output power is temperature independent. Experimental results for the L-band demonstrated that average gain, and hence, total output power, can be adjusted by as much as 4 dB when temperature is varied from −10 C. to 80 degrees Celsius even though the amplifier is saturated. It is believed that this distinctive behavior results form the large amount of backward ASE generated in the L-band erbium coil. Temperature affects the accumulation of backward ASE so that the output power can vary even though the absorbed pump power does not change.

The above described manifestation of temperature dependence makes TIGS a useful tool to control gain tilt at high inversion and total output power at low inversion. Accordingly, TIGS can be used to compensate for pump wavelength and power drift, or to compensate increased passive loss due to component degradation. The temperature induced gain variations (at high inversion) are very similar in shape and magnitude to those observed for NGS as shown in FIGS. 2a and 2b. Thus temperature induced gain saturation can be employed to compensate NGS that can result from incomplete channel loading. Alternatively, NGS may be employed (by applying a "dummy" saturation signal) to compensate for erbium coil temperature variations.

In one embodiment of the invention, a method of operating an erbium-doped optical amplifier for amplifying a signal in an L-band spectral region from about 1565 nm to about 1620 nm of an associated L-band gain spectrum of the amplifier includes non-homogeneously saturating the gain of the amplifier in the L-band to control the shape of the gain spectrum. This preferably maybe accomplished in one aspect of this embodiment by positioning at least one gain-saturating signal at a selected wavelength in the L-band. The effect of the non-homogeneous gain saturation in the L-band according to the invention is moderated by the pump wavelength band used to pump the amplifier. The 980 nm pump band and the 1480 nm pump band are preferably utilized to increase or decrease non-homogeneous gain saturation at a particular saturating wavelength; however, other pump bands may be utilized.

In another aspect of the invention, the step of non-homogeneously saturating the gain of the amplifier to control the gain shape of the gain spectrum involves controlling the temperature of at least a portion of the gain medium to non-homogeneously saturate the gain of the amplifier. Preferably, the temperature of the gain medium is controlled to between about −10° C. to +80° C.

In another embodiment of the invention, a method of operating an L-band optical amplifier involves temperature inducing gain saturation in the gain medium to compensate for spectral gain changes caused by non-homogeneous gain saturation other than temperature-induced non-homogeneous gain saturation.

In an alternative embodiment, a method for operating an L-band optical amplifier involves non-homogeneously gain saturating the amplifier gain medium with a saturating signal to compensate for spectral gain changes due to temperature variation of the gain medium.

Modifications that do not depart from the scope and spirit of the invention will be evident to persons of ordinary skill in the art from the disclosure herein. The following claims are intended to cover the specific embodiments set forth herein as well as such modification, variations, and equivalents.

I claim:

1. A method of operating an erbium doped optical amplifier for amplifying a signal in a spectral region above about 1565 nm comprising the step of controlling the shape of the gain spectrum of the optical amplifier by nonhomogeneously saturating the gain of the amplifier.

2. The method of claim 1 further comprising the step of positioning a gain saturating signal at a selected wavelength in the spectral region.

3. The method of claim 2 further comprising the step of positioning a single gain saturating signal at a single selected wavelength in the spectral region.

4. The method of claim 1 further comprising the step of changing the nonhomogeneous gain saturation (NGS) at a particular saturating wavelength by pumping the amplifier in a pump band of approximately 980 nm.

5. The method of claim 1 further comprising the step of changing the nonhomogeneous gain saturation (NGS) at a particular saturating wavelength by pumping the amplifier in a pump band of approximately 1480 nm.

6. The method of claim 4, wherein pumping in the 980 nm band results in decreased NGS for saturating signals in a shorter wavelength region and increased NSG for saturating signals in a longer wavelength region relative to pumping in the 1480 nm band.

* * * * *